US006178444B1

(12) United States Patent
Okataku et al.

(10) Patent No.: US 6,178,444 B1
(45) Date of Patent: Jan. 23, 2001

(54) SYSTEM AND METHOD THAT PREVENT MESSAGES TRANSFERRED AMONG NETWORKED DATA PROCESSING SYSTEMS FROM BECOMING OUT OF SEQUENCE

(75) Inventors: Yasukuni Okataku; Hiroshi Kaibe, both of Tokyo; Shinsuke Tamura, Kanagawa-ken, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/812,907

(22) Filed: Mar. 10, 1997

(30) Foreign Application Priority Data

Mar. 11, 1996 (JP) .................................................... 8-053501

(51) Int. Cl.⁷ ............................ G06F 15/16; G05B 19/18
(52) U.S. Cl. ............................................. 709/208; 700/3
(58) Field of Search .................... 395/200.38, 200.39, 395/200.41, 800.31, 290, 200.31; 364/131, 132, 187, 140.04; 712/31; 710/110; 709/201, 208, 209, 211; 700/1–2, 82, 21

(56) References Cited

U.S. PATENT DOCUMENTS

| 4,807,224 | * | 2/1989 | Naron et al. ........................... 370/218 |
| 4,969,146 | * | 11/1990 | Twitty et al. .......................... 370/338 |
| 5,086,428 | * | 2/1992 | Perlman et al. ...................... 370/394 |
| 5,109,384 | * | 4/1992 | Tseung ............................... 340/825.15 |
| 5,216,675 | * | 6/1993 | Melliar-Smith et al. ............ 370/400 |
| 5,355,371 | * | 10/1994 | Auerbach et al. ................... 370/255 |
| 5,418,937 | * | 5/1995 | Inoue ................................. 395/184.01 |
| 5,551,066 | * | 8/1996 | Stillman et al. ........................ 455/69 |
| 5,612,957 | * | 3/1997 | Gregerson et al. .................. 370/401 |
| 5,655,079 | * | 8/1997 | Hirasawa et al. ............... 395/200.75 |
| 5,659,787 | * | 8/1997 | Schieltz ........................... 395/200.56 |
| 5,701,427 | * | 12/1997 | Lathrop ................................. 709/237 |
| 5,704,032 | * | 12/1997 | Badovinatz et al. ............. 395/182.02 |
| 5,805,578 | * | 9/1998 | Stirpe et al. ........................... 370/255 |
| 5,809,222 | * | 9/1998 | Kizu et al. ............................ 709/208 |
| 5,862,348 | * | 1/1999 | Pedersen .............................. 709/229 |
| 5,884,018 | * | 3/1999 | Jardine et al. ............................ 714/4 |
| 5,919,266 | * | 6/1999 | Sud et al. .............................. 714/13 |
| 5,938,732 | * | 8/1999 | Lim et al. ............................. 709/229 |

OTHER PUBLICATIONS

Levine, B., et al., "The Case for Reliable Concurrent Multicasting Using Shared ACK Trees," Proc. of ACM Multimedia 96, ACM, pp. 365–376, Nov. 1996.*

(List continued on next page.)

*Primary Examiner*—Zarni Maung
*Assistant Examiner*—Andrew Caldwell
(74) *Attorney, Agent, or Firm*—Finnegan, Henderson, Farabow, Garrett & Dunner, L.L.P.

(57) ABSTRACT

Data processing systems, each belonging to one of a number of program groups, are connected to a network. Each group includes a data processing system containing a sequencer which determines the sequence of messages transferred over the network. The sequencer of each data processing system is either in the "operation mode" or in the "standby mode." A sequencer in the standby mode declares the operation mode independently of other sequencers and sends this operation mode declaration to the sequencers of the other data processing systems. When the operation mode declaration is sent a number of times equal to a specified count, the sequencer becomes the operation mode sequencer. When the operation mode sequencer stops, some other standby mode sequencer takes over the function of the operation mode sequencer, thus maintaining consistency in the sequence of messages to be sent to a plurality of data processing systems connected to the network.

7 Claims, 8 Drawing Sheets

OTHER PUBLICATIONS

Kim, J., et al., "A Distributed Election Protocol for Unreliable Networks," J. of Parallel & Distributed Computing, vol. 35, No. 1, pp. 35–42, May 1996.*

Singh, G., "Leader Election in the Presence of Link Failures," IEEE Trans. on Parallel & Distributed Systems, vol. 7, No. 3, pp. 231–236, Mar. 1996.*

Kim, T., et al., "A Leader Election Algorithm in a Distributed Computing System," Proc. of the 5th IEEE Comp. Society Workshop on the Future Trends of Distributed Computing Systems, IEEE, pp. 481–485, Aug. 1995.*

Floyd, S., et al., "A Reliable Multicast Framework for Light–Weight Sessions and Application Level Framing," Proc. of the Conf. on Applications, Technologies, Architectues, and Protocols for Computer Communication, ACM, pp. 342–356, Aug. 1995.*

Abu–Amara, H., et al., Election in Asynchronous Complete Networks with Intermittent Link Failures, IEEE Trans. on Computers, vol. 43, No. 7, pp. 778–788, Jul. 1994.*

Abu–Amara, H., et al., "On the Complexities of Leader Election Algorithms," Proc. of ICCI '93, IEEE, pp. 202–206, May 1993.*

Chow, Y., et al., "An Optimal Distributed Algorithm for Failure Driven Leader Election in Bounded–Degree Networks," Proc. of the 3rd Workshop on the Future Trends of Distributed Computing Systems, IEEE, pp. 136–141, Apr. 1992.*

Singh, S., et al., "Electing Leader Based Upon Performance: The Delay Model," Proc. of the 11th Int'l. Conf. on Distributed Computing Systems, IEEE, pp. 464–471, May 1991.*

Singh, S., "Efficient Distributed Algorithms for Leader Election in Complete Networks," Proc. of the 11th Int'l. Conf. on Distributed Computing Systems, IEEE, pp. 472–479, May 1991.*

Itai, A., et al., "Optimal Distributed t–Resilient Election in Complete Networks," IEEE Trans. on Software, vol. 16, No. 4, pp. 415–420, Apr. 1990.*

Kim, J., et al., A Robust Distributed Election Protocol, Proc. of the 7th Symposium on Reliable Distributed Systems, IEEE, pp. 54–60, Oct. 1988.*

Garcia–Molina, H., et al, "Reliable Broadcast in Networks with Nonprogrammable Servers," Proc. of the 8th Int'l. Conf. on Distributed Computing Systems, IEEE, pp. 428–437, Jun. 1988.*

Abu–Amara, H., Fault–Tolerant Distributed Algorithm for Election in Complete Networks, IEEE Trans. on Computers, vol. 37, No. 4, pp. 449–453, Apr. 1988.*

King, C., et al., "Distributed Election in Computer Networks," Proc. of the 7th Annual Int'l. Phonix Conf. on Computers and Communications, IEEE, pp. 348–352, Nov. 1996.*

M. Kaashoek et al., "An Efficient Reliable Broadcast Protocol", ACM Operating Systems Review, 23(4):5–19 (1989).

* cited by examiner

SYSTEM AND METHOD THAT PREVENT MESSAGES TRANSFERRED AMONG NETWORKED DATA PROCESSING SYSTEMS FROM BECOMING OUT OF SEQUENCE

BACKGROUND OF THE INVENTION

1. Field of the Invention

This invention relates to a computer system containing a plurality of data processing systems connected over a network for distributed data processing. More specifically, this invention relates to a data processing method as well as the systems on which the data processing method is implemented.

2. Description of the Prior Art

It is required that industrial systems such as chemical or steel plants, traffic control systems, and power systems including nuclear power plants, always be controlled correctly. This requires that data be processed in the correct sequence when controlling these systems.

One of the means to control these systems is to use a plurality of distributed data processing systems. This control means has a group of control units, each having a data processing system. These data processing systems are connected over a network to exchange control data (control messages) among them and to operate control units. For this type of control means, it should be noted that a plurality of data pieces sent from the sending system are not always received by the receiving system in the sequence in which they are sent. If the receiving system do not receive them in the sequence in which they are sent and control them in different sequence, the system safety may be affected.

For example, assume that two data processing systems connected over a computer network control an reactor as shown in FIG. 8. The reactor 100, which contains the heater 101, heats the materials fed from the materials feed pipe 102 and ejects a resulting product into the product ejection pipe 103. The materials feed pipe 102 has the flow adjustment valve 104 to adjust the feed speed. This materials feed pipe 102 and the flow adjustment valve 104 may be controlled by two data processing systems, one contained in this control unit and the other connected to this data processing system over a network. For example, the first data processing system is installed in the central control room of the plant, and the second data processing system is installed on the control unit to run two programs: "the materials feed control program" and "the flow adjustment valve control program". The second data processing system uses these two programs to control the temperature and the flow amount in the plant in accordance with messages from the first data processing system. Assume that the first data processing system sends the command "Open flow-adjustment valve 10 degrees" and then the command "Feed 20 Kg of materials to reactor". That is, the first data processing system sends the "flow" command and "materials" command in this sequence.

However, the second data processing system may receive the "materials" command and then the "flow" command because these two commands are sent along two different paths. Upon receiving the "materials" command, the second data processing system starts "the materials feed control program" and, before adjusting the flow, feeds 20 Kg of materials into the reactor. This is not the sequence intended by the first data processing system. This incorrect sequence of operation causes an abnormal reaction, endangering the safe plant operation.

To ensure the safe plant operation, the data processing system is sometimes duplicated to allow the overall system operation to continue even if an error occurs in the hardware constituting one of those systems. For example, assume that three data processing systems are connected to a computer network and that "the materials feed control program" and "the flow adjustment valve control program" stored in the second data processing system control the temperature and flow amount in the plant according to the control messages from the first data processing system. The third data processing system also contains these two programs to allow the whole plant system operation to continue even when a hardware error occurs in the second or third data processing system.

In a configuration described above, assume that the first data processing system sends the command "Open flow-adjustment valve 10 degrees" and then the command "Feed 20 Kg of materials to reactor".

However, the second data processing system and the third data processing system may receive the commands in different sequences because these two commands are sent along two different paths: that is, in some cases, the former receives the "materials" command and then the "flow" command while the latter may receive the "flow" command and then the "materials" command. Upon receiving the "materials" command, the second data processing system starts "the materials feed control program" and, before adjusting the flow, feeds 20 Kg of materials to the reactor. This is not the sequence intended by the first data processing system. On the other hand, the third data processing system first starts "the flow adjustment valve control program" and then feeds 20 Kg of materials to the reactor. This is the sequence intended by the first data processing system. This means that, even if the same commands are received by the second data processing system and the third data processing system as sent by the first data processing system, the consistency of the process cannot be maintained. As a result, if the third data processing system which has received the sequence of commands correctly fails, the commands received by the second data processing system, one of the duplicated systems, are executed. This results in an abnormal reaction and endangers the safe plant operation.

To eliminate an inconsistency in the sequence of operation, a data processing system containing a sequencer, which specifies the sequence of messages, has been devised heretofore. This sequencer makes it possible to send the commands to all the data processing systems in the same sequence, eliminating the inconsistency. More specifically, this sequencer sends to all the data processing systems a command specifying the sequence of messages (hereafter called a processing sequence command) on which the sequence of message operation of each data processing system is based.

Generally, a sequencer sends the processing sequence command based on the sequence in which the sequencer received the messages. Other data processing systems store the messages received from the sequencer for a while and, after receiving the sequence command from the sequencer, processes the sequence of messages based on the sequence command.

For system safety, the sequencer is also duplicated. That is, a plurality of sequencers are connected to a network, each in one of two modes: "operation mode" and "standby mode". A data processing system containing a sequencer in "the operation mode" (hereafter called an operation mode sequencer) controls the units of the whole plant system. On the other hand, while the data processing system containing the operation mode sequencer is active, a data processing system containing a sequencer in "the standby mode" (hereafter called standby mode sequencer) is in the standby state and does not send the message processing sequence command. That is, when an operation mode sequencer receives a plurality of messages, the sequence in which the sequencer receives the messages is sent to a standby mode sequencer and other data operating systems.

However, a conventional data processing system containing a sequencer has the following problem. When the data processing system containing "the operation mode sequencer" fails, some other data processing system must take over the processing of the failed data processing system in order to continue to control various kinds of plant system. To take over the processing successfully, the conventional system has a predetermined sequencer. And, the operation mode sequencer sends message processing sequence information to the data processing system of each control unit as well as to the predetermined standby mode sequencer. This requires the operation mode sequencer to continually send message processing sequence information to the standby mode sequencer.

However, neither messages are always sent over a network in the same sequences, nor is message processing sequence information. That is, the operation mode sequencer and the standby mode sequencer on the network do not always synchronize with each other just because the former sends message processing sequence information to the latter. Therefore, it is necessary to monitor that the operation mode sequencer and the standby mode sequencer are consistent in the message processing sequence. This requires the two sequencers to exchange synchronization messages.

This synchronization message is exchanged between the operation mode sequencer and a standby mode sequencer independently. This requires the operation mode sequencer to send a synchronization message in addition to message processing sequence information, increasing the overall system load. In addition, a complicated or critical system where a plurality of standby mode sequencers are provided must do synchronization processing more frequently, further degrading the system performance.

As described above, in a system according to the prior art, one or more specific data processing systems are decided to be standby mode sequencers previously and a synchronization process is needed between the standby mode sequencers and the operation mode sequencer. This increases the load on the system.

In addition, in a conventional system, a single sequencer manages message processing sequence information on all the data processing systems on the network. This increases the network processing load as more and more messages are exchanged among data processing systems, degrading the overall system performance.

This invention seeks to solve the problems associated with the prior art described above. It is an object of this invention to eliminate the need to synchronize between the operation mode sequencer and the standby mode sequencer in a plurality of data processing systems connected over network each other and to provide a data processing method and a data processing system which enhance the system processing capability.

It is another object of this invention, when an operation mode sequencer fails or stops, to allow one of the other data processing systems on the network to automatically take over the processing of the failed or stopped operation mode sequencer in order to eliminate the need for reserving a standby mode sequencer.

It is still another object of this invention, when a plurality of data processing systems on the network contain different types of program, to provide a plurality of operation mode sequencers according to the type of program to be executed in order to distribute the load among the operation mode sequencers.

SUMMARY OF THE INVENTION

A data processing system according to the present invention is connected to other data processing systems over a network. It has a sequencer which determines the processing sequence of messages sent or received over the network. The data processing system according to the present invention comprises: operation mode setting means for setting the mode of said sequencer either "an operation mode" or "a standby mode"; sending means for sending information on the mode of said sequencer set by said operation mode setting means, processing messages about programs to be executed by other data processing systems, and a command specifying the sequence of said processing messages to said data processing systems connected to the network; receiving means for receiving information on said mode of the sequencer set by said operation mode setting means, processing messages about programs to be executed by the data processing system, and a command specifying the sequence of said messages from other data processing systems connected to the network; and message management means for managing processing messages received from other data processing systems.

According to the present invention having the configuration described above, the mode of the sequencer on each of a plurality of data processing systems connected over a network is set to either "the operation mode" or "the standby mode". This mode information is sent to other data processing systems. Therefore, the data processing systems on the network know which data processing system is now in the operation mode. These data processing systems execute messages according to a processing sequence command sent from the data processing system containing the operation mode sequencer. This ensures consistency in the sequence of messages sent or received among a plurality of data processing systems on the network. In addition, as the message management function checks that the received message is correct and that the whole message has been received, the message is always received correctly.

A data processing system according to the present invention may be connected to at least two types of sequencers. The data processing system comprises the sequencer selection means which enables the data processing system to select a sequencer suitable for the program the system is going to process.

A data processing system according to the present invention having the above configuration uses the sequencer selection means to select a sequencer needed for the programs to be executed by each system. The data processing system can hold information on the sequence of messages received from the selected sequencer. This makes it possible for the messages, transferred among data processing systems, to be distributed among computer networks each associated with a specific type of sequencer, thus allowing a large volume of data to be processed and the overall system performance to be increased.

Other and further objects, features and advantages of the invention will appear more fully from the following description.

DETAILED DESCRIPTION

Referring to the attached drawings, there is shown a preferred embodiment of the present invention. Each of the functions of the embodiments described below is implemented by a computer program controlling a computer and its peripheral units. This specification uses virtual circuit blocks (means, sections, etc.), each provided for a function or a processing unit, to explain the invention and the embodiments. Therefore, there is no one-to-one correspondence between blocks and hardware or software components.

1. First Embodiment 1-1. Data Processing Systems Connected to a Network

Figure 1:
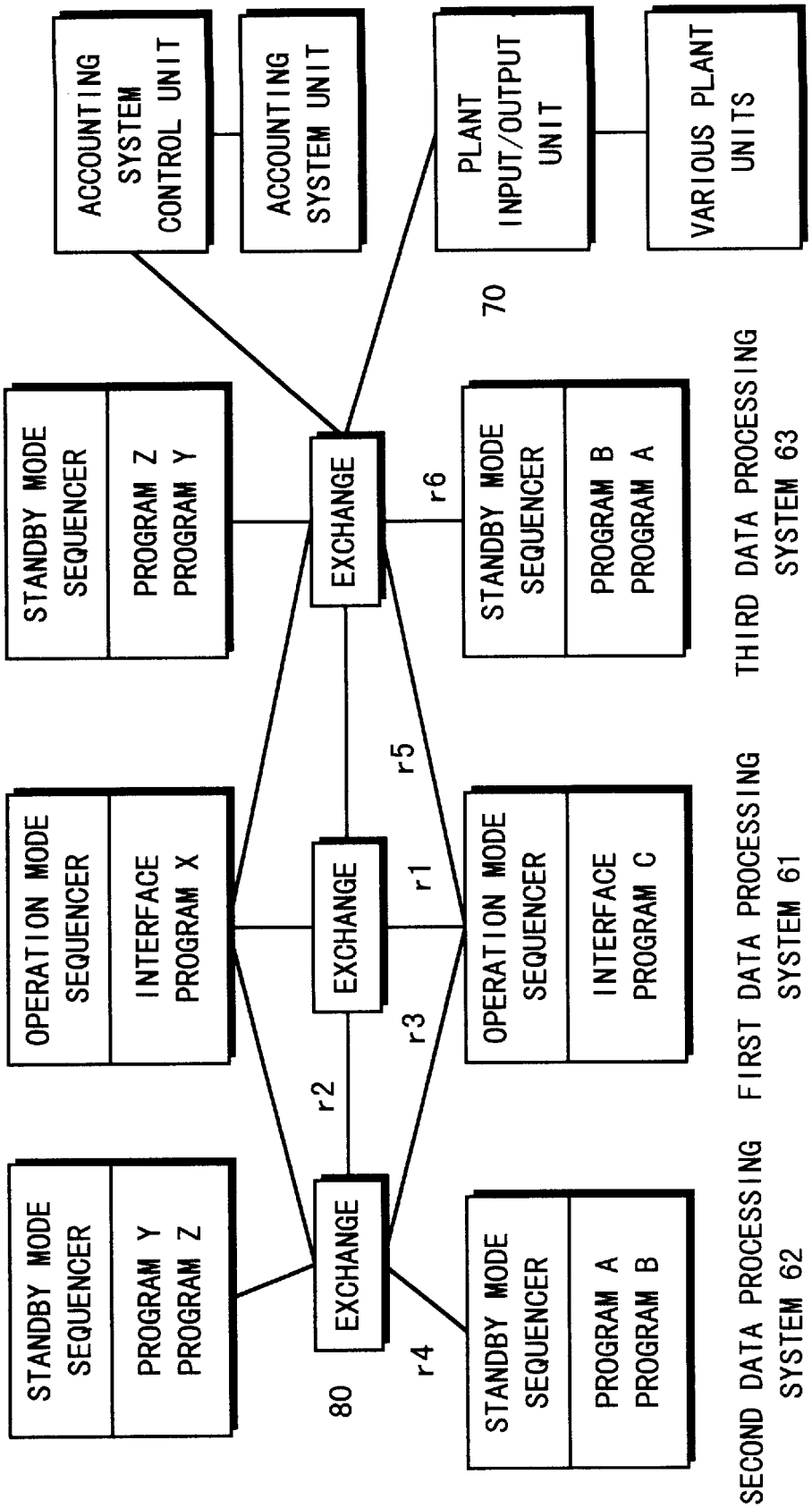
FIG. 1 is a diagram showing networked data processing systems according to this invention.
Figure 8:
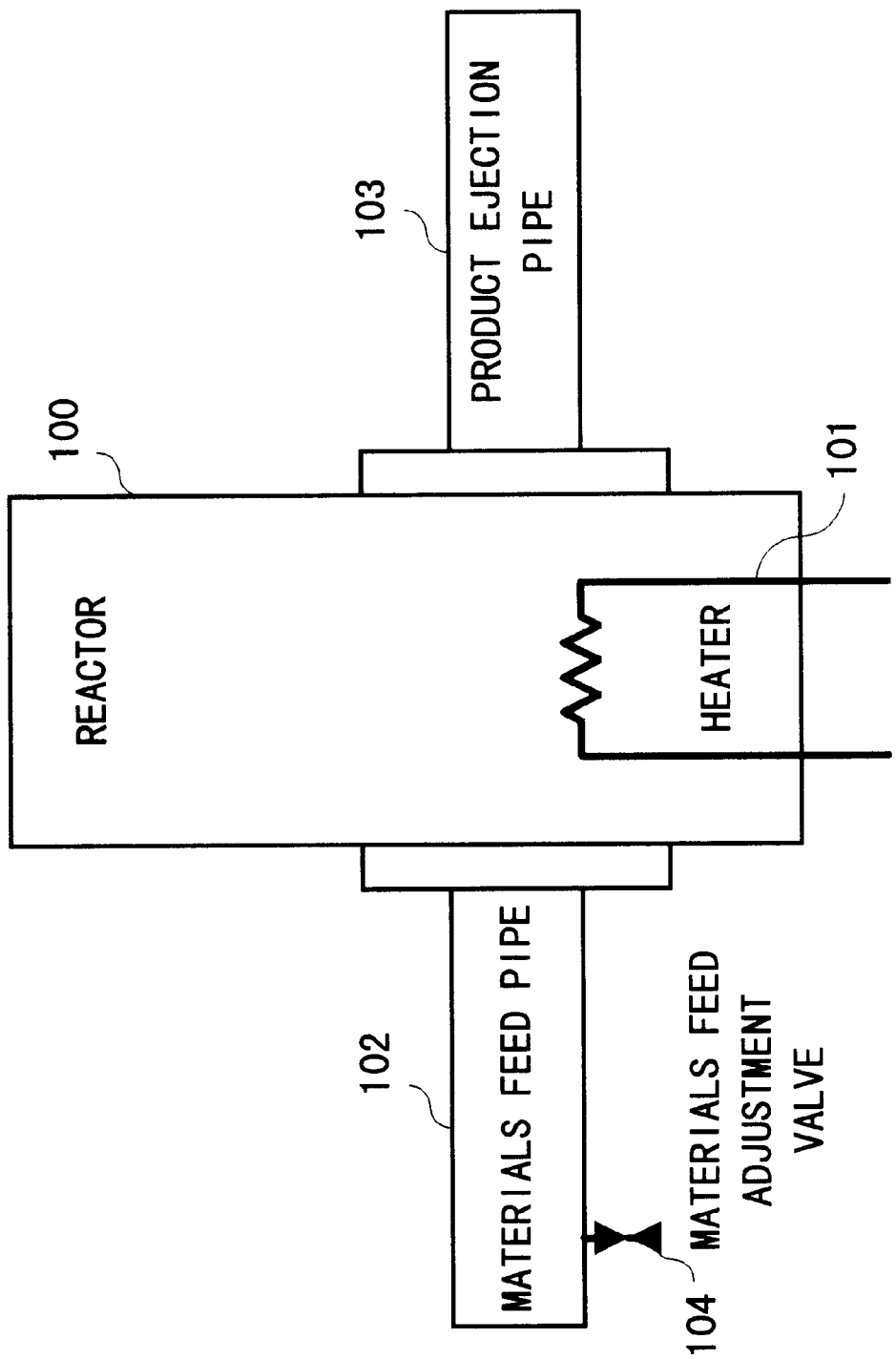
FIG. 8 is a schematic representation showing an example of chemical plant controlled by the data processing system.

In this embodiment, a plurality of data processing systems according to the present invention are connected to a network as shown in FIG. 1. They control a chemical plant control system shown in FIG. 8 as well as a clerical work processing system required for managing the chemical plant.

This embodiment has two groups of data processing systems: one group is composed of a plurality of data processing systems for processing plant control programs and the other group is composed of a plurality of data processing systems for processing clerical work processing management programs. Each of these groups has a plurality of data processing systems each containing a sequencer. In each group, the sequencer of one of these plurality of data processing systems is in the operation mode, while the sequencers of the other data processing systems are in the standby mode. Each data processing system has a sequencer selection means. This sequencer selection means selects a sequencer which a data processing system uses a message processing sequence command sent from to be used to run the programs.

In this embodiment, the sequencer which received a plurality of processing messages decides the processing sequence of the messages based on the sequence in which it received the messages. However, this sequencer sends the decided processing sequence command to the network in the operation mode and does not in the standby mode. In addition, each data processing system stores the received processing message for a while and does not process them immediately. Each data processing system, after receiving the processing sequence command from the operation mode sequencer, processes the stored messages based on the command.

FIG. 1 shows the data processing systems connected to a network. Note that the data processing systems without sequencers are not included in this figure. As shown in FIG. 1, the following are connected to the network: the first data processing system 61 containing "an operation mode sequencer" to control the whole chemical plant, the second and third data processing systems 62 and 63 each containing "a standby mode sequencer", and the plant input/output system 70. The network is composed of the exchanges 80 and the network paths r1–r6. The second and third data processing systems 62 and 63, each containing a standby mode sequencer, have two duplicated programs: "materials feed control program A" and "the flow amount adjustment valve control program B". The first data processing system 61, containing the operation mode sequencer, has interface program C to send control commands to programs A and B. Upon receiving a processing sequence command from the operation mode sequencer contained in the first data processing system 61, both the second and third data processing systems 62 and 63 start executing the programs according to the processing sequence command.

On the other hand, the data processing systems 91–93 are connected to the network to manage the clerical work processing systems. Of these three systems, the first data processing system 91 has an operation mode sequencer, as with the first data processing system 61 which controls the plant units. The first data processing system 91 also has interface program X for sending control commands to the second and third data processing systems 92 and 93. The second and third data processing systems 92 and 93 each have a standby mode sequencer as well as clerical work processing programs such as the inventory control program Y and the accounting processing program Z. As with the plant control program, the programs Y and Z also have a negative impact on the whole plant system if incoming messages are out of sequence.

The embodiment with the configuration described above operates as follows. In FIG. 1, assume that program C in the first data processing system 61 containing the operation mode sequencer sends the command "Open flow-adjustment valve 10 degrees" and then the command "Feed 20 Kg of materials to reactor". Also assume that the second data processing system 62 has received the "materials" command and then the "flow" command and that the third data processing system 63 has received the "flow" command and then the "materials" command. This is because the commands are sent along different paths over the network.

For example, the "materials" command is sent to the second data processing system 62 along the network path r1→r2→r4, and the "flow" command along the network path r3→r4. In this case, the second data processing system 62 first receives the "materials" command and then the "flow command". On the other hand, both commands are sent to the third data processing system 63 along the same network path r5→r6. This results in two different sequences of commands (or messages). The second data processing system 62 receives the commands in a sequence different from that in which program C in the first data processing system 61 containing the operation mode sequencer has sent the commands. And, the third data processing system 63 receives the commands in the same sequence in which program C in the first data processing system 61 has sent the commands.

However, in this embodiment, both the second and third data processing systems 62 and 63 process the above two messages only after a processing sequence command is received from the operation mode sequencer contained in the first data processing system 61. Thus, if a processing sequence command received by a data processing system does not match the processing sequence command from the data processing system containing the operation mode sequencer, the received messages are not processed. As a result, the messages are always processed consistently according to a processing sequence command from the sending system regardless of the sequence in which the messages are received.

The standby mode sequencers in the second and third data processing systems 62 and 63 process messages according to a processing sequence command received from the operation mode sequencer in the first data processing system 61 and, at the same time, save the processing sequence command. In this case, the operation mode sequencer and the standby mode sequencers do not synchronize to check the contents of the processing sequence command with each other, eliminating the need for exchanging synchronization messages. In addition, when the first data processing system 61 fails, which data processing system, second or third, will take over the processing of the failed operation mode sequencer is not predetermined. That is, in this embodiment, the second data processing system 62 or third data processing system 63, whichever has the latest and correct processing sequence command, takes over the processing of the operation mode sequencer.

The same is true of the data processing systems 91, 92, and 93 which control the clerical work processing systems. For example, the chemical plant system first runs the inventory control program to order materials and then runs the accounting processing program to pay for the materials. Running these programs in the reverse sequence is not practical. To ensure the correct sequence, the operation mode sequencer in the first data processing system 91 maintains the consistency of the sequence of messages that will be sent to the programs Y and Z contained in the second data processing system 92 and 93.

In this embodiment, a pair of data processing systems containing the operation mode sequencer are connected to the network, for example 61 and 91, one for each program group. Each of these data processing systems has a sequencer selection means. This sequencer selection means selects and receives only those processing messages and processing sequence commands, sent from the operation mode sequencer, which are processable by the programs in each data processing system. The sequencer selection means also selects and receives the sequencer operation mode information only on the programs processable by the programs of the data processing system. Therefore, a data processing system takes over the processing of the operation mode sequencer only when the operation mode sequencer associated with its own programs fails or stops.

1-2. Configuration of a Data Processing System

Figure 2:
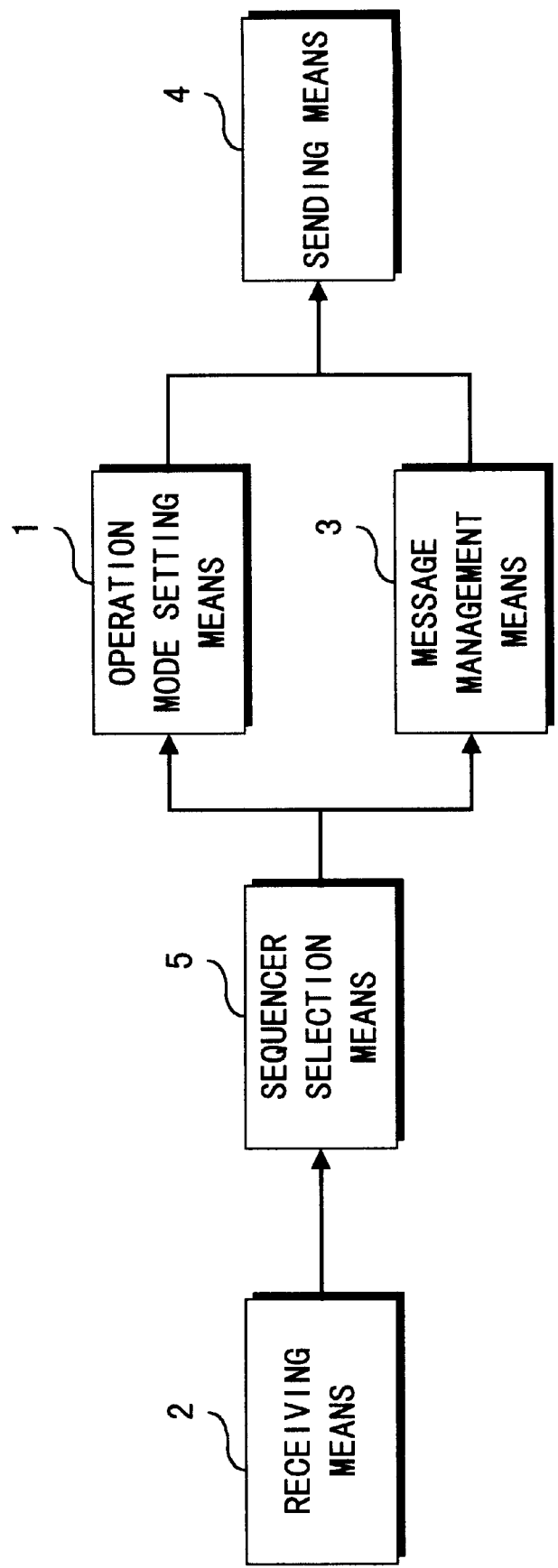
FIG. 2 is a functional block diagram showing the basic configuration of the first embodiment of a data processing system according to this invention.

FIG. 2 shows the configuration of a data processing system containing a sequencer. That is, the data processing system in this embodiment comprises the operation mode setting means 1 for setting the mode of the sequencer installed on the data processing system to either "the operation mode" or "the standby mode", the receive means 2 for receiving mode information and message information from other data processing systems on the network, the message management means 3 for checking if a message from some other data processing system is correct and if a whole message has been received, and the send means 4 for sending "mode information" and "message information". In addition, the data processing system in this embodiment has the sequencer selection means 5 for selecting a sequencer from a plurality of sequencers.

Figure 3:
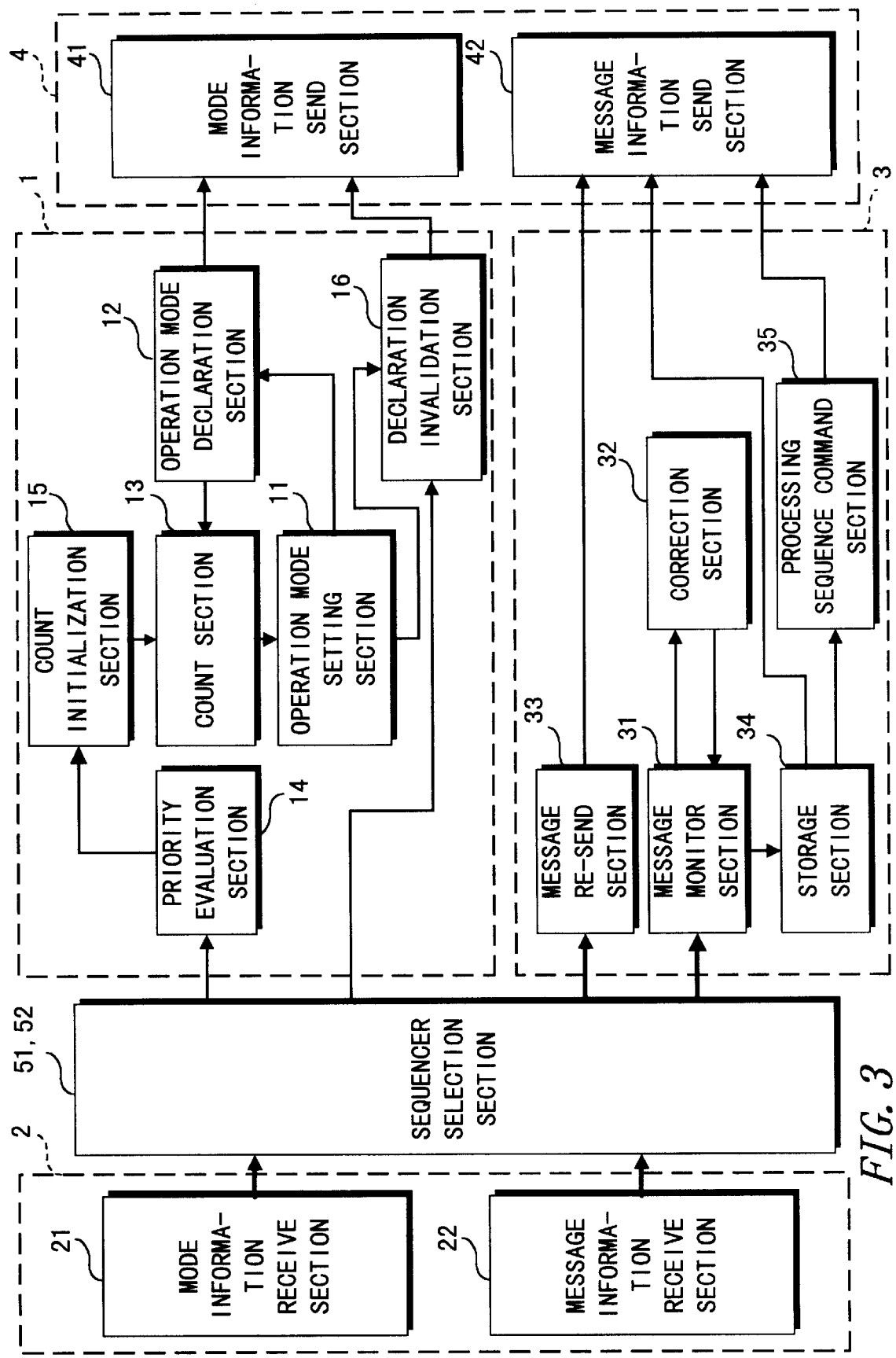
FIG. 3 is a functional block diagram showing the detailed configuration of the first embodiment of this invention.

Referring now to FIG. 3, there is shown each of the means described above. As shown in FIG. 3, the operation mode setting means 1 comprises the following:

(1) Operation mode setting section 11 which automatically sets the sequencer mode to either "the operation mode" or "the standby mode". Here, that the operation mode setting section 11 sets the mode "automatically" means that the section sets the mode "independently of other sequencers."

(2) Operation mode declaration section 12 which informs (declares) the other data processing systems, when the sequencer of the data processing system enters "the operation mode", that this data processing system contains the "operation mode sequencer".

(3) Count section 13 which counts the number of times the operation mode declaration section 12 declares that the sequencer is the "operation mode sequencer".

(4) Priority evaluation section 14 which evaluates the priority of this data processing system in relation to the data processing system which has sent the "operation mode sequencer" message to this data processing system.

(5) Count initialization section 15 which initializes the declaration count containing the number of times this data processing system has declared that it has the "operation mode sequencer". This declaration count is initialized when the priority evaluation section 14 has evaluated that the priority of the other data processing system is higher than that of this data processing system.

(6) Declaration invalidation section 16 which informs the other data processing system, which has sent the "operation mode sequencer" message to this data processing system, that the received operation mode declaration is invalid.

The receive means 2 comprises the following:

(1) Mode information receive section 21 which receives the "operation mode sequencer" message from other data processing systems on the network.

(2) Message information receive section 22 which receives processing messages from other data processing systems. The message information receive section 22 receives processing sequence commands from some other data processing system which has "the operation mode sequencer".

The message management means 3 comprises the following:

(1) Message monitor section 31 which checks if a processing message received by the receive means 2 is correct and if a whole message has been received.

(2) Correction section 32 which requests the sending data processing system to re-send a processing message received by the message monitor section 31 and corrects the processing message based on the re-sent message. This process is executed when the message contains error information (incorrect or lost message).

(3) Message re-send section 33 which re-sends a message requested by some other data processing system.

(4) Storage section 34 which stores processing messages received from other data processing systems or corrected processing messages. In most cases, "a processing sequence command" is stored in the storage section 34 until the sequencer of the data processing system becomes "the operation mode sequencer".

(5) Processing sequence command section 35 which sends the processing sequence command of the processing message to other data processing systems on the network when the sequencer of the data processing system becomes "the operation mode sequencer".

The send means 4 comprises the following:

(1) Mode information send section 41 which sends to other data processing systems a declaration message indicating that this data processing system has "the operation mode sequencer". The mode information send section 41 also sends the message indicating that "an operation mode declaration sent from some other data processing system is invalid" passed from the declaration invalidation section 16.

(2) Message information send section 42 which re-sends a message requested by some other data processing system and which sends the "processing sequence command" to other data processing systems on the network when the sequencer of this data processing system becomes "the operation mode sequencer". In addition, the message information send section 42 sends a processing message to other data processing systems when the sequencer of this data processing system is the operation mode sequencer and the processing message is not yet sent to other data processing systems.

As shown in FIG. 3, the sequencer selection means 5 comprises the sequencer selection sections 51 and 52, which receive data from the mode information receive section 21 and the message information receive section 22. The sequencer selection sections 51 and 52 check if a message processing sequence command or an operation mode sequencer declaration received by the mode information receive section 21 or the message information receive section 22 is sent from an intended sequencer.

1-3. Operation of the First Embodiment

Referring to the flowchart, there is shown the operation of the embodiment with the above configuration.

1-3-1. Operation Mode Setting (1)

Figure 4:
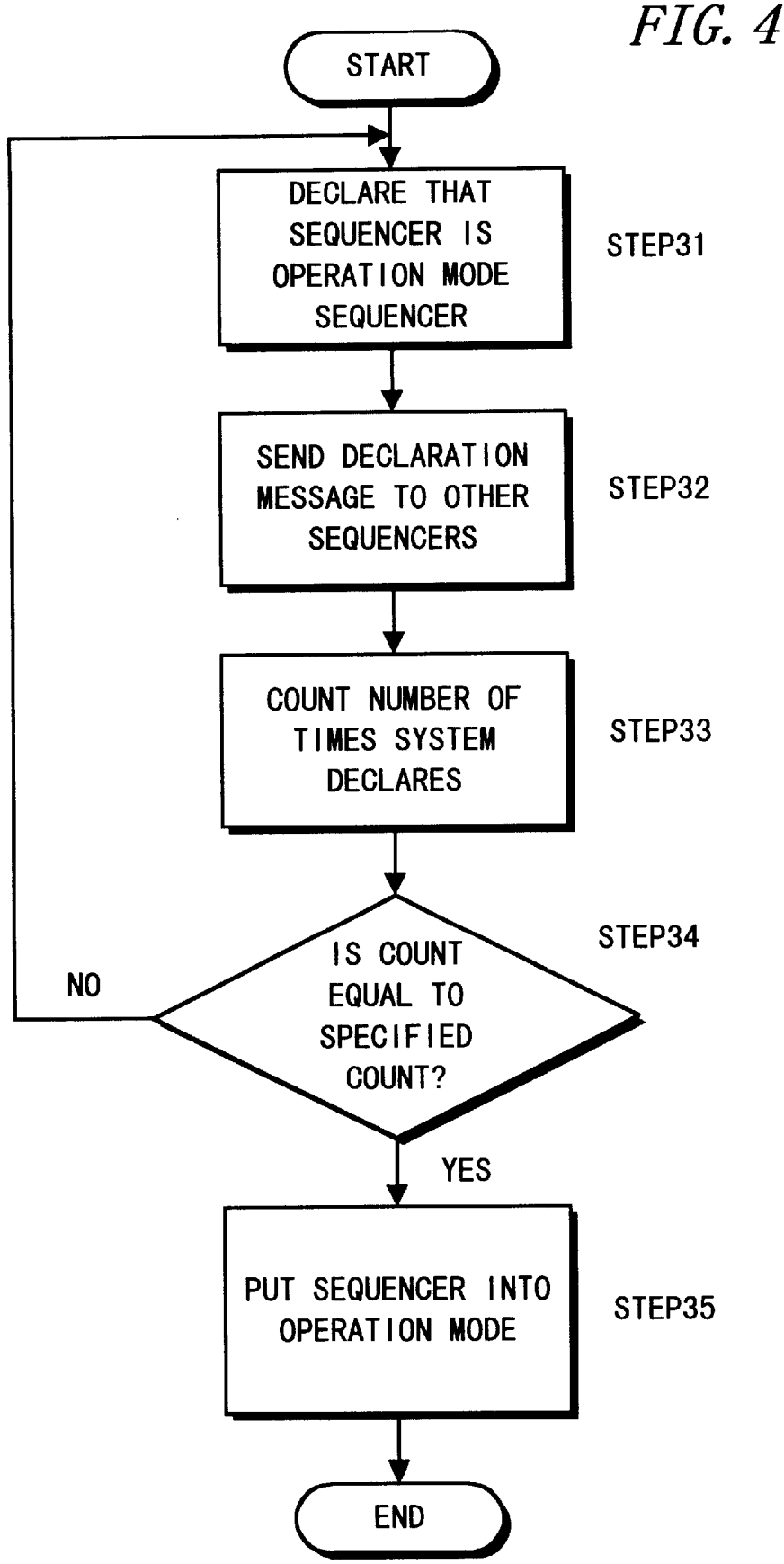
FIG. 4 is a flowchart showing the flow of processing when a plurality of data processing systems interconnected over a network are started independently in the first embodiment of this invention.

The following explains how the operation mode setting means 1 operates. The flowchart in FIG. 4 shows the flow of a data processing system started independently of other data processing systems. The data processing system uses the operation mode declaration section 12 to declare that this data processing system is "the operation mode sequencer" (step 31). The send means 4 uses the mode information send section 41 to send this declaration message to other data processing systems on the network (step 32). The interval at which the operation mode declaration section 12 sends a declaration message depends on the data processing system.

The data processing system declares "operation mode sequencer" declaration repeatedly, and the count section 13 counts the number of times the data processing system declares that it is the operation mode sequencer (step 33). The count section 13 checks if the declaration count reaches the specified number of times (step 34). When the count reaches the specified number of times, this data processing system enters the operation mode (step 35); otherwise, control returns to step 31.

1-3-2. Operation Mode Setting (2)

Figure 5:
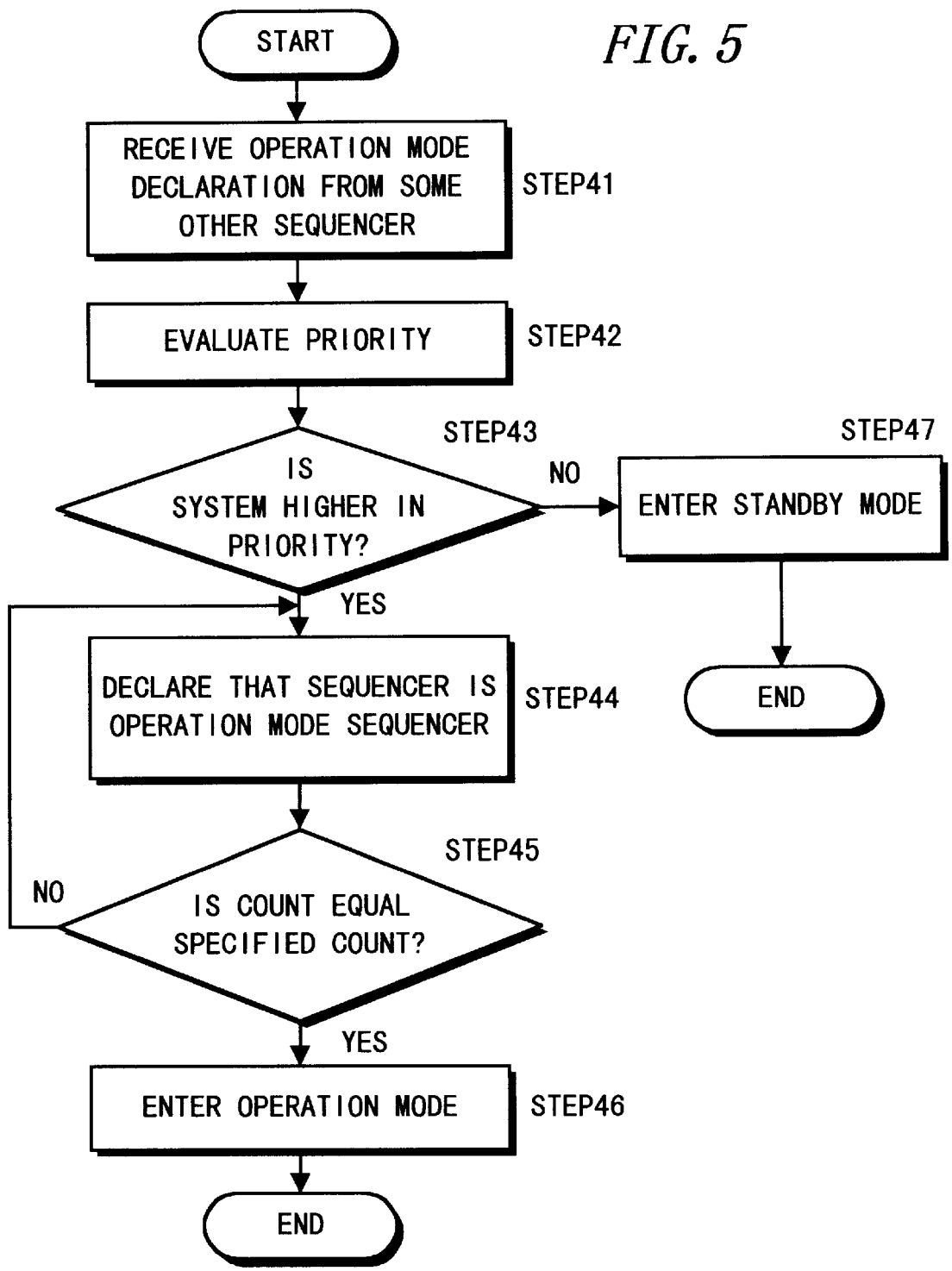
FIG. 5 is a flowchart showing the flow of processing when an operation mode declaration message is received from another data processing system on a network in the first embodiment of this invention.

FIG. 5 is a flowchart showing the flow when a data processing system receives an operation mode declaration message from some other data processing system on the network. When the data processing system receives the operation mode declaration message from some other data processing system (step 41), the priority evaluation section 14 compares the priority between the two data processing systems (step 42). If this (receiving) data processing system is higher in priority, (step 43), the operation mode declaration section 12 declares that the sequencer of this data processing system is the operation mode sequencer (step 44). The mode information send section 41 of the send means 4 sends this declaration message to other data processing systems on the network (see FIG. 3).

The count section 13 counts the number of times the data processing system declares that it is the operation mode sequencer. The count section 13 checks if the declaration count reaches the specified number of times (step 45). When the count reaches the specified number of times, this data processing system enters the operation mode (step 46); otherwise, control returns to step 44.

If this (receiving) data processing system is lower in priority in step 43, the data processing system enters "the standby mode" (step 47).

1-3-3. Operation Mode Declaration Invalidation Information

If, after a data processing system enters the operation mode, the data processing system receives an operation mode declaration message from some other data processing system, the declaration invalidation section 16 sends the operation mode invalidation information to the sending data processing system. This informs the sending data processing system that there is already a operation mode data processing system. Then, the sending data processing system enters the standby mode.

1-3-4. Message Management Processing

Figure 6:
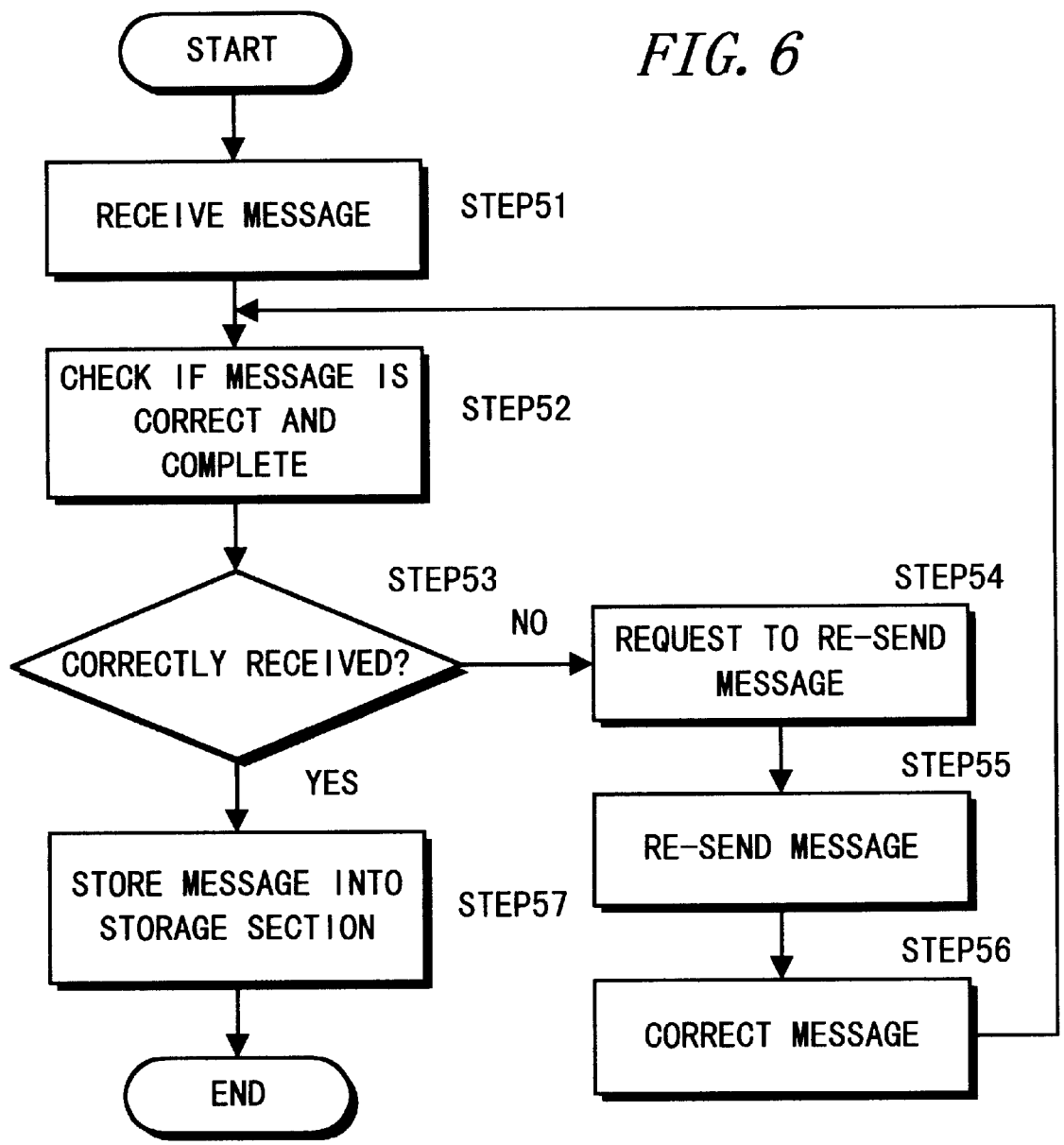
FIG. 6 is a flowchart showing the flow of processing when a processing message is received from another data processing system on a network in the first embodiment of this invention.

The message management means 3 operates as follows. FIG. 6 is a flowchart showing how a data processing system operates when it receives a processing message from some other data processing system. When the data processing system receives a processing message from some other data processing system via the receive means 2 (step 51), the message monitor section 31 checks if the received processing message is correct and if the whole message has been received (steps 52 and 53).

When the processing message is not correct or some message has not been received, the correction section 32 requests the other data processing system to re-send the message (step 54). Upon receiving the correct processing message or all message that has not been received (step 55), the correction section 32 corrects the processing message based on the re-sent message (step 56). Then, control returns to step 52, and the message monitor section 31 checks if the processing message has been received correctly again (step 52). On the other hand, the message, if received correctly in step 53, is stored in the storage section 34.

The message re-send section 33 re-sends a message to some other data processing system from which a re-send request is received.

1-3-5. Processing Sequence Command Output Processing

Once a data processing system enters "the operation mode", the message management means 3 of the system sends "the processing sequence command" to other data processing systems on the network. That is, after the processing described in "1-3-4 Message management processing" is performed in all the standby mode data processing systems to check that the processing message has been received correctly, the operation mode data processing system sends "the processing sequence command" of the message, stored in the message buffer, to the standby mode data processing systems.

1-3-6. Sequencer Selection

In a network where there are a plurality of paths connecting a plurality of data processing systems and where there is only one type of "operation mode sequencer" as in a conventional system, "the operation mode sequencer" must decide the processing sequence of all the messages. It is apparent that, in a plant control system, the processing sequence of the related programs is significant and must be consistent among all the data processing systems of the plant system. However, in a system where two different types of program group, e.g., "the plant control program group" and "the clerical work processing program group", are mixed, there is no need to maintain consistency in the processing sequence; these two groups may be executed concurrently. The sequencer selection section 52 of a data processing system in this embodiment allows the system to select a sequencer which sends a processing sequence command required by the program the system is going to execute. Therefore, even if the message information receive section 22 receives processing sequence commands from a plurality of sequencers, the data processing system is able to store and retain only the processing sequence commands required by the data processing system.

Note that processing messages are not selected by the sequencer selection section 52; they are stored in the storage section 34.

The sequencer selection section 51 checks a sequencer mode setting message, received by the mode information receive section 21, if it is from the sequencer group associated with the data processing system. If the sequencer selection section 51 finds that the message is from the associated sequencer group, it sends the message to the priority evaluation section 14 and the declaration invalidation section 16 to determine if the data processing system must set the operation mode; otherwise, the sequencer selection section 51 does not process the message. In other words, even if an operation mode sequencer not associated with the program group of the data processing system fails or stops, the sequencer selection section 51 does not set the operation mode of the data processing system.

1-4. Effects of the First Embodiment

In a conventional system, a processing sequence command must be sent to "the operation mode sequencer" as well as to "the standby mode sequencers" each time it is generated. There is no such need in a data processing system of this embodiment and in the data processing method used in the system. This eliminates the need for message exchange processing to maintain synchronization between "the operation mode sequencer" and "the standby mode sequencers". In addition, because messages are processed according to a processing sequence command from the data processing system in the operation mode, the messages are processed in the correct sequence.

That is, when the operation mode sequencer fails or stops, one of standby mode sequencers which satisfies the condition becomes the operation mode sequencer. More specifically, a standby mode sequencer which correctly keeps the processing sequence command, which was sent from the operation mode sequencer before failure, becomes the new operation mode sequencer. This is done by checking the processing messages and processing sequence command of each standby mode sequencer. This eliminates the need for predetermining a standby mode sequencer which will take over the processing of the operation mode sequencer, and allows the new operation mode sequencer to send the correct processing sequence command to other data processing systems.

In addition, when there are a plurality of active program groups, the sequencer selection means 5 enables a data processing system to select a sequencer associated with each program. And, the selected sequencer controls the message processing sequence of the program, significantly increasing the overall system efficiency. This also makes it possible for a plurality of sequencers to run concurrently on a plurality of data processing systems on the network, efficiently distributing the message processing load of the sequencer and enhancing the overall system capability.

2. Other Preferred Embodiment

This invention is not restricted to the preferred embodiment described herein, but may be embodied in other specific forms, such as those described below, without departing from the spirit or essential characteristics thereof.

In the above embodiment, "the operation mode sequencer" automatically determines "the processing sequence command". In this case, the message sending program (for example, interface program C) may affect the sequence of messages by sending message processing sequence information to "the operation mode sequencer".

For example, program C may add to the command messages a piece of message processing sequence information requesting that the "flow" command be executed before "materials" command.

Figure 7:
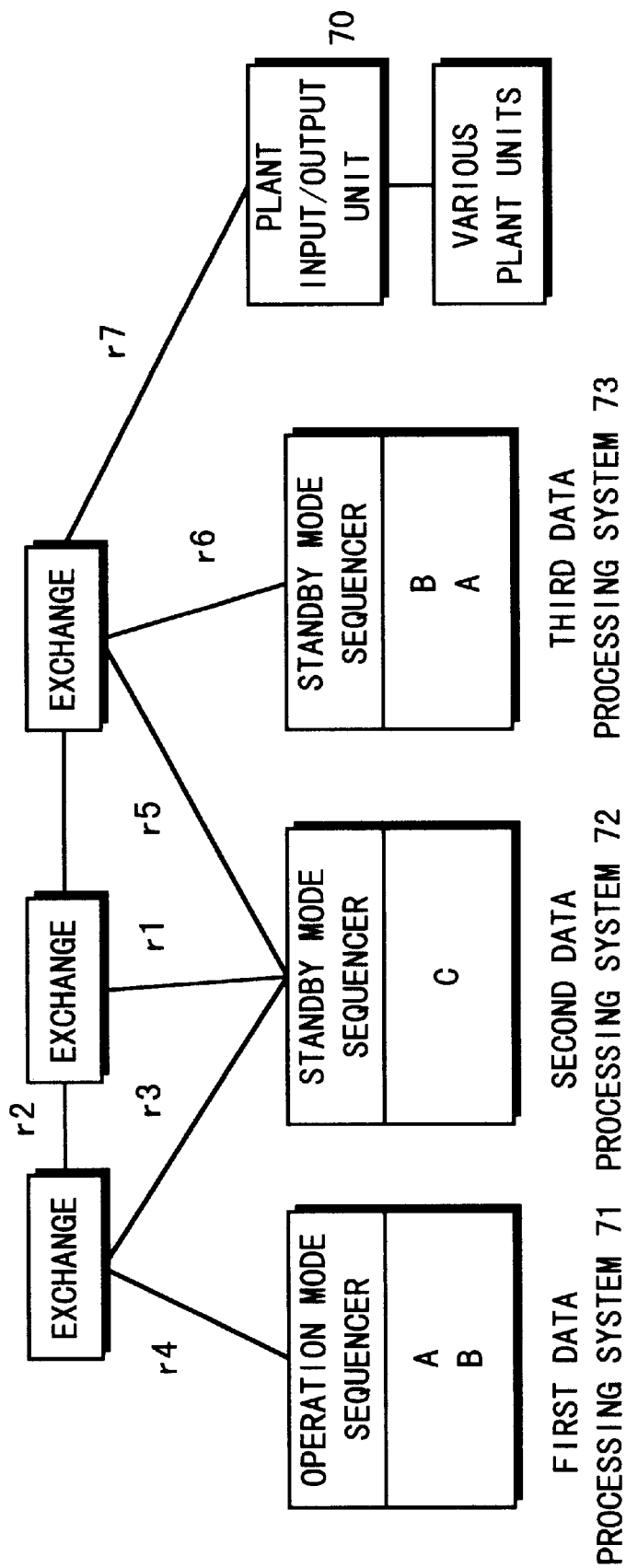
FIG. 7 is a schematic representation showing another embodiment of this invention.

This embodiment is useful when the first data processing system 71 is the operation mode sequencer and the second data processing system 72 is a standby mode sequencer, as shown in FIG. 7.

As in the above embodiment, assume that the first data processing system 71 receives a processing sequence command containing the "materials" command and the "flow" command in this sequence. If the first data processing system 71 sends the processing sequence command to other data processing systems simply because its sequencer becomes the "operation mode sequencer", the chemical plant system cannot be controlled as intended by program C, the message source program. In this case, the "processing sequence request information", if added to the control messages by program C, allows all the data processing systems to receive messages in the sequence requested by program C. This ensures that message are always processed correctly regardless of which data processing system becomes the operation mode sequencer.

Unlike the chemical plant in the above embodiment, the sequence of messages is not so significant in some systems. Those systems require only a consistency among the data processing systems connected to the network. In this case, the data processing system in the operation mode sends a processing sequence command; then, all the other data processing systems follow the messages.

In addition, not all the data processing systems on the network need not contain sequencers. The same effect may be produced even if only some of the data processing systems contain sequencers.

In the above embodiment, a sequencer which received a plurality of processing messages sends the sequence of the messages to other data processing systems based on the sequence in which the sequencer received the messages. Instead, the sequencer may have stored a priority of messages previously, and may sort received messages based on this priority. Then the sequencer may send the processing sequence command according to the result of the sorting.

3. Example

The following explains the embodiment more in details.

The following symbols and notations are used in the explanation. "SeqFlagList" is a list indicating which CPU is the operation mode sequencer. For example, [00100] indicates that CPU3 is the operation mode sequencer.

"pACNList", represented as [total PACN:CPUid:individual pACN], is the accumulating total count of message sequence lists (a.pol) that were sent, where "total pACN" is the total accumulation count of "a.pols" that were sent to the network, "individual pACN" is a list of the accumulation count of "a.pols" sent from each CPU, and CPUid is the identifier of a data processing system. This notation helps compare the priorities. For example, [6:3:10500] indicates that "the operation mode sequencer" CPU3 has sent "5" (individual pACN) "a.pols". In this embodiment, four data processing systems (CPUs), "1", "2", "3", and "4", are connected to the network.

mACNList, represented as [total mACN:source CPUid-:individual mACN], is the accumulating total count of messages, where "total mACN" is the total accumulation count of messages that were sent to the network, "individual mACN" is a list of the accumulation count of messages sent from each CPU. For example, {16:3:[31237]} indicates that CPU3 has sent "2" (individual mACN) messages.

The message formats are as follows:
(1) A message is sent: {0:SeqFlagList:mACNList:message body}
(2) Sequencer operation mode: {1:SeqFlagList:pACNList:a.pol}
(3) Sequencer operation mode is declared: {2:SeqFlagList pACNList}

In a system where a plurality of operation modes for different program groups are provided as in the above embodiment, a special flag specifying the destination of a message is provided in addition to the sequencer operation messages (2) and (3). This flag indicate to which program group the message belong.

3-1. Operation Mode Sequencer Selection

In a system composed of a plurality of data processing systems each having the configuration of this embodiment, "the standby mode sequencers" of the data processing systems interact with each other to select an operation mode data processing system. This selection is done by the operation mode declaration section 12 and the priority evaluation section 14 of each standby mode sequencer.

That is, immediately after a CPU connected to the network in this embodiment is started, the operation mode setting section 11 causes the CPU to enter the operation mode. The operation mode declaration section 12 declares that the CPU is "the operation mode sequencer". The send means 4 sends this declaration message to other CPUs in the network.

For example, the operation mode declaration section 12 of CPU3 declares that the CPU is "the operation mode sequencer" and then sends the message (2:SeqFlagList [00100]:pACNList [1:3:00100]) to other CPUs in the network. Upon receiving this message, a data processing system on the network where a plurality of program groups are provided, the sequencer setting means of each data processing system checks if the message is for the program group associated with itself. If so, the data processing system receives the message.

Each time the operation mode declaration section 12 of CPU3 sends the declaration message at a regular interval, the count section 13 increments the declaration count (SeqFlagCount). The interval at which the operation mode declaration section 12 sends the declaration message depends on the CPU.

Then, CPU4 is started, and the operation mode declaration section 12 of CPU4 declares that it is the operation mode sequencer. As with CPU3, the operation mode declaration section 12 sends the message (2:SeqFlagList [00010] :pACNList [1:4:00010]) to other CPUs in the network. Because CPU4 has already received the operation mode declaration message from CPU3, the priority evaluation section 14 of CPU4 compares the priority with that of CPU3. If CPU3 is higher than CPU4 in priority, the CPU4 becomes the standby mode sequencer.

Then CPU1 and CPU2 are started, and the operation mode declaration section 12 of each CPU declares that it is the operation mode sequencer. The operation mode declaration section 12 of CPU1 or CPU2 sends the message (2:SeqFlagList [10000]:pACNList [1:1:10000]) or (2:SeqFlagList [01000]:pACNList [1:2:01000]) to the other CPUs in the network. The priority evaluation section 14 of each CPU compares the priorities. If CPU 1 is higher than CPU2 in priority, CPU2 becomes "a standby mode sequencer" automatically. CPU3 and CPU4 also receive the operation mode declaration messages of CPU1 and CPU2. And the priority evaluation section 14 of CPU3 or CPU4 compares its priority with that of CPU1. If CPU1 is higher in priority, CPU3 or CPU4 becomes a standby mode sequencer.

On the other hand, the count section 13 of CPU1 checks if the operation mode declaration count has reached the specified number of times. If it has, CPU1 enters the operation mode to start sending application messages.

The "specified number of times" mentioned above depends on the CPU. Once the number of operation mode declarations has reached the specified number of times and the CPU has become "the operation mode sequencer", the declaration invalidation section 16 sends an operation mode declaration invalidation message to a higher-priority CPU which may send the operation mode declaration message later.

3-2. Message Count Monitoring and Message Validity Check

After the whole system is started and "the operation mode sequencer" is decided as described above, the program execution means of each data processing system uses the send means 4 and receive means 2 to send and receive messages. At this time, if a failure is found in some data processing system, the message monitor section 31 checks if the message has been received from that data processing system correctly. If it has not, the system retries to receive the message. In the following discussion, CPU1 is assumed to be "the operation mode sequencer".

First, CPU1 sends message M1 to the other CPUs via the message information send section 42 of the send means 4. Message M1 is (0:[10000]:[1:1:10000]:M1)/ *{0:SeqFlagList mACNList:message body}. The message format {0:SeqFlagList:mACNL:message body} is the format in which the message body is sent.

In this embodiment, assume that CPU1, CPU2, and CPU4 have received message M1 successfully but that CPU3 has not. The message monitor section 31 of each CPU compares the above mACNList with that of the CPU of its own to check if the message has been receive correctly. More specifically, CPU1, CPU2, and CPU4 each compare mACNList [0:0:0000] before reception with mACNList [1:1:10000] to check if the message has been received correctly. On the other hand, CPU3 which failed in receiving message M1 does not know that message M1 was sent from CPU1 and, therefore, cannot check if the message has been received correctly. mACNList of CPU3 remains [0:0:00000] even after reception.

Then, CPU2 sends message M2 to the other CPUs via the message information send section 42 of the send means 4. Message M2 is (0:[10000]:[2:2:11000]:M2)/*{0: SeqFlagList mACNList:message body}.

The message monitor section 31 of each CPU compares the above mACNList with that of the CPU of its own to check if the whole message has been received correctly. More specifically, CPU2, and CPU4 each compare mACNList [10000] which is an mACNList before reception with mACNList [11000] to check if the whole message has been received correctly.

And, CPU3 compares mACNList [00000] which is an mACNList before reception with mACNList [11000] which is an mACNList after reception to find the message difference list [11000]. Then, CPU3 finds that the difference in the message count for CPU2 is "1" and that the message M2 has been received correctly. It also finds that the message accumulation count for CPU1 is "1" and that the message from CPU1 was lost; so it requests other CPUs to resend the message. That is, CPU3 finds, at this point, that message M1 was lost.

After CPU3 receives message M1 which was re-sent, it sends message M3 to other CPUs via the message information send section 42 of the send means 4. Assume that all the CPUs have received this message correctly. Message M3 is (0:[10000]:[3:3:11100]:M3)/*{0: SeqFlagList:mACNList::message body}.

As with the above case, the message monitor section 31 of each CPU compares mACNList with that of it own to check that the whole message has been received correctly. More specifically, CPU2, CPU3 and CPU4 each compare mACNList [11000] which is an mACNList before reception with mACNList [11100] which is an mACNList after reception.

And, CPU1 compares mACNList [10000] which is an mACNList before reception with mACNList [11100] which is an mACNList after reception, and finds the message difference list [01100]. Then, CPU1 finds that the difference in the message count for CPU3 is "1" and that the message M3 has been received correctly. It also finds that the message accumulation count for CPU2 is "1" and that the message from CPU2 was lost; so it requests other CPUs to re-send the message and receives the message (0:[10000]:[3:2:111000]: M2).

In addition, CPU4 sends message M4 to other CPUs via the message information send section 42 of the send means 4. Assume that all the CPUs have received this message M4. Message M4 is (0:[10000]:[4:4:11110]:M4) /*{0: SeqFlagList:mACNList:message body}. As with the above case, the message monitor section 31 of each CPU compares mACNList with that of it own to check that the whole message has been received correctly. It confirms that all the CPUs have received the whole message. Then, CPU1, "the operation mode sequencer", is ready for sending to all the CPUs the information on the sequence of messages in the buffer.

That is, CPU1, "the operation mode sequencer", copies the contents of the message buffer to the message processing sequence list (a.pol) the operation mode sequencer is going to send, and starts the processing sequence command section 35 to send pACNList and the message processing sequence list [M1M2M3M4] which will be described later. The message format is (1:[10000]:[1:1:10000]:[M1M2M3M4])/*(1:SeqFlag:pACNList:a.pol)*/.

3-3. New Operation Mode Sequencer Selection (1)

If CPU1, "the operation mode sequencer", fails after it sends "a processing sequence command" to other CPUs, a data processing system to act as a new "operation mode sequencer" is selected from the remaining data processing systems for continued operation. In the following discussion, assume that CPU3 did not receive the above message correctly. More specifically, assume that CPU1, "the operation mode sequencer", failed after it sent "the processing sequence command" (1:SeqFlagList:pANCList:a.pol), that CPU2 and CPU4 received "the processing sequence command" correctly, and that CPU3 failed in receiving it. If this happens, CPU2 and CPU4 each compare received SeqFlag [10000] with the current SeqFlag to check whether or not "the operation mode sequencer" is correct.

Then, CPU2 processes message M1 but does not output it to the network. On the other hand, the operation mode setting section 11 of CPU3 automatically determines that CPU1, "the operation mode sequencer", failed and declares the operation mode to become "the operation mode sequencer". The format of the operation mode declaration message is (2:SeqFlag [00100]:pACNList [1:3:00100]).

Upon receiving the operation mode declaration message from CPU3, the send/receive component of CPU2 and/or CPU4 detects that the processing sequence command from CPU1 was lost on CPU3 and re-sends the lost processing sequence message (1: [10000]:[1:1:10000]:[M1M2M3M4]) to CPU3. That is, the validity of the operation mode declaration message is determined by the CPUs (CPU2 and CPU4 in this example) except the CPU which sends it (CPU3 in this example).

Upon receiving the processing sequence message (1: [10000]:[1:1:10000]:[M1M2M3M4]) from CPU2 and/or CPU4, CPU3 finds that the operation mode declaration is invalid. In other word, CPU3 finds that it cannot become "the operation mode sequencer", causing the operation mode setting section 11 to change the mode from "the operation mode" to "the standby mode". Then, the CPUs start message processing according to the message processing sequence list (a.pol) sent from CPU1 which was the operation mode sequencer.

The application program in each of CPU2, CPU3, and CPU4 tries to send messages. However, because CPU1 which is "the operation mode sequencer" is failing, no CPU receives "the processing sequence command" from "the operation mode sequencer". This causes each CPU to enter the operation mode declaration mode and, based on the procedure described in "3-1. Operation mode sequencer selection", one of three CPUs becomes "the operation mode sequencer".

3-4. New Operation Mode Sequencer Selection (2)

When CPU1, "the operation mode sequencer", fails before sending the processing sequence command to other CPUs, a data processing system is selected to be a new "operation mode sequencer" and takes over the processing correctly. This is done as follows. That is, when the CPU1 which has been acting as the operation mode sequencer fails and each of the other CPUs finds that fact, the operation mode declaration section 12 of each of CPU2, CPU3, and CPU4 causes its own CPU to do operation mode declaration asynchronously. For example, CPU3 sends (2:SeqFlagList [00100]:pACNList [1:3:00100]) to other CPUs, where "2" indicates the operation mode declaration mode.

The operation mode declaration section 12 causes each CPU in the standby mode to repeat operation mode declaration at an interval. And, if CPU2 has reached the specified declaration count before CPU3 and CPU4, it becomes "the operation mode sequencer". And, CPU3 and CPU4, which receive the operation mode declaration message from CPU2, become "standby mode sequencers".

CPU2, which has reached the specified number of declaration count, starts preparing for sending messages. At this time, CPU1 which was the previous operation-mode sequencer is restarted. Because CPU2 is already "the operation mode sequencer", CPU1 becomes "a standby mode sequencer" even if it enters the operation mode declaration mode. The declaration invalidation section 16 of CPU2 sends the message "You should be a slave" to CPU1.

As described above, a data processing system and a data processing method according to this invention can prevent the messages, transferred among networked data processing systems, from becoming out of sequence. In addition, providing a plurality of sequencer types helps distribute the network processing load. While a preferred embodiment has been described, variations thereto will occur to those skilled in the art within the scope of the present inventive concepts which are delineated by the following claims.

What is claimed is:

1. A data processing system connected to a network, comprising:

a receiving section receiving messages and other information from other data processing systems in the network, the messages including processing messages about programs to be executed by the data processing system;

a sending section sending messages to other data processing systems in the network, the messages including processing messages about programs to be executed by the other data processing systems;

an operation mode setting section setting a mode of the data processing system to "an operation mode" for providing a sequencer message for each of the messages to be transferred on the network, or to "a standby mode" for not providing the sequencer message, one of the data processing systems in the network being allowed to be in the operation mode and others of the data processing systems being in the standby mode;

an operation declaration section sending to other data processing systems a declaration message saying that the data processing system is ready to be in the operation mode when the receiving section fails to receive the sequencer message for the received messages, when the receiving section receives a declaration message from another one of the data processing systems, the data processing system being in the standby mode;

a count section counting the number of times that said operation mode declaration section declares, in a specified timing, that the data processing system is ready to be in the operation mode, the data processing system entering the operation mode as a new sequencer when the number of declarations reaches a specified count;

a message management section managing the processing messages received from the other data processing systems;

a sequencer selection section for selecting sequencer messages sent from a sequencer in a group to which the data processing system belongs out of sequencer messages sent from sequencers not in the group; and a declaration invalidation section for informing another data processing system that sent out a declaration message that the declaration message is invalid, if the data processing system was already first to enter the operation mode as the new sequencer.

2. A data processing system as claimed in claim 1 wherein said message management section comprises:

a message monitor section checking said processing messages received via said receiving section; and a correction section requesting some other data processing system, when said message monitor section detects an error in one of said received processing messages, to re-send the received processing message and, based on the re-sent message, correcting the processing message.

3. A data processing system as claimed in claim 1 wherein said message management section comprises:

a message re-send section re-sending a message when some other data processing system requests the data processing system to re-send the message; and a storage section storing processing messages received from other data processing systems and corrected processing messages.

4. A data processing system connected to a network, comprising:

receiving means for receiving messages and other information from other data processing systems in the network, said messages including processing messages about programs to be executed by the data processing system;

sending means for sending messages to other data processing systems in the network, said messages including processing messages about programs to be executed by the other data processing systems;

an operation mode setting section setting a mode of the data processing system to "an operation mode" for providing sequence information for each of the messages to be transferred on the network, or to "a standby mode" for not providing the sequence information, one of the data processing systems in the network being allowed to be in the operation mode and others of the data processing systems being in the standby mode;

an operation mode declaration section sending to other data processing systems a declaration message saying that the data processing system is ready to be in the operation mode when said receiving means fails to receive said sequence information for the received messages, when the receiving means receives a declaration message from another one of the data processing systems, the data processing system being in the standby mode;

a count section counting the number of times that said operation mode declaration section declares, in a specified timing, that the data processing system is ready to be in the operation mode, the data processing system entering the operation mode as a new sequencer when the number of declarations reaches a specified count;

message management means for managing the processing messages received from the other data processing systems; and a declaration invalidation section for informing another data processing system that sent out a declaration message that the declaration message is invalid, if the data processing system was already first to enter the operation mode as the new sequencer.

5. A data processing system as claimed in claim 4 further comprising:

a priority evaluation section comparing the priority of the data processing system with that of some other data processing system connected to the network when an operation mode declaration message is received from the other data processing system; and a count initialization section initializing, when said priority evaluation section finds that the priority of the other data processing system is higher than that of the data processing system, the count indicating the number of times the data processing system has declared the operation mode.

6. A data processing system as claimed in claim 4 wherein said message management means comprises:

a message monitor section checking said processing messages received via said receiving means; and a correction section requesting some other data processing system, when said message monitor section detects an error in one of said received processing messages, to re-send the received processing message and, based on the re-sent message, correcting the processing message.

7. A data processing system as claimed in claim 4 wherein said message management means comprises:

a message re-send section re-sending a message when some other data processing system requests the data processing system to re-send the message; and a storage section storing processing messages received from other data processing systems and corrected processing messages.

* * * * *